US008660326B2

(12) United States Patent
Ohayon et al.

(10) Patent No.: US 8,660,326 B2
(45) Date of Patent: Feb. 25, 2014

(54) IMAGE PROCESSING METHOD FOR ESTIMATING A RISK OF ATHEROMA PLAQUE BREAKAGE

(75) Inventors: Jacques Ohayon, Tresserve (FR); Simon Le Floc'H, Grenoble (FR); Gerard Finet, Collonges au Mont D'Or (FR); Philippe Tracqui, Meylan (FR)

(73) Assignees: Universite Joseph Fourier, St. Martin d'Heres (FR); Centre National de la Recherche Scientifique (CNRS), Paris (FR)

( * ) Notice: Subject to any disclaimer, the term of this patent is extended or adjusted under 35 U.S.C. 154(b) by 98 days.

(21) Appl. No.: 13/128,625

(22) PCT Filed: Nov. 23, 2009

(86) PCT No.: PCT/EP2009/065617
§ 371 (c)(1),
(2), (4) Date: Jul. 26, 2011

(87) PCT Pub. No.: WO2010/066561
PCT Pub. Date: Jun. 17, 2010

(65) Prior Publication Data
US 2011/0282182 A1 Nov. 17, 2011

(30) Foreign Application Priority Data
Nov. 21, 2008 (FR) ...................................... 08 57929

(51) Int. Cl.
*G06K 9/00* (2006.01)
(52) U.S. Cl.
USPC ........... 382/128; 382/243; 600/301; 600/437; 600/438; 600/443; 600/449; 606/20; 606/5
(58) Field of Classification Search
None
See application file for complete search history.

(56) References Cited

U.S. PATENT DOCUMENTS 5,474,070 A * 12/1995 Ophir et al. ................... 600/437
6,132,373 A * 10/2000 Ito et al. ........................ 600/437
(Continued)

FOREIGN PATENT DOCUMENTS

EP 1421905 A1 * 5/2004 ............... A61B 8/08
EP 1713398 A1 * 10/2006 ............... A61B 8/08

OTHER PUBLICATIONS

Ohayon et al., Influence of Residual Stress/Strain on the Biomechanical Stability of Vulnerable Coronary Plaques Potential Impact for Evaluating the Risk of Plaque Rupture, AM J Physiol Heart Circ Physiol, Jun. 29, 2007, No. 293, pp. 1987-1996.

(Continued)

*Primary Examiner* — Tsung-Yin Tsai
(74) *Attorney, Agent, or Firm* — Blakely Sokoloff Taylor & Zafman

(57) ABSTRACT

The invention relates to an image processing method for estimating a risk of atheroma plaque breakage, that includes the step of receiving (40) a so-called elastogram image representing the inner deformation resulting from the compression of an analyzed blood vessel tissue based on blood pressure, the step of pre-segmenting (50) the elastogram in order to obtain a pre-segmented image including a plurality of areas, and the step of calculating an elasticity image (60) representing the elasticity of at least one region of the elastogram, the region corresponding to an area selected among the plurality of areas of the pre-segmented image, and the elasticity image enabling the user to estimate the risk of atheroma plaque breakage, wherein said method is characterized in that: the pre-segmentation is carried out while considering the tissue as being a non-compressible elastic solid in order to determine the Young modulus gradient as equal to the sum of the Lagrange multiplier gradient and of a space depending vector, and in that the pre-segmentation includes determining the outlines of each area in the plurality of areas using said space depending vector.

11 Claims, 2 Drawing Sheets

(56) References Cited

U.S. PATENT DOCUMENTS

Figure 2:
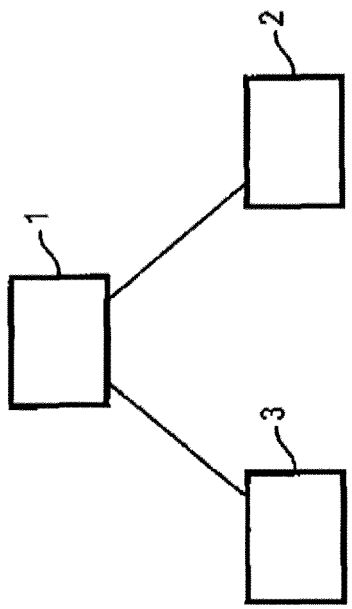

| | | | |
|---|---|---|---|
| 6,270,459 | B1 | 8/2001 | Konofagou et al. |
| 6,277,074 | B1* | 8/2001 | Chaturvedi et al. ........... 600/437 |
| 7,338,452 | B2* | 3/2008 | Shiina et al. .................. 600/467 |
| 8,172,754 | B2* | 5/2012 | Watanabe et al. ............. 600/443 |
| 8,298,143 | B2* | 10/2012 | Kanai et al. ................... 600/437 |
| 2002/0188286 | A1* | 12/2002 | Quijano et al. ................. 606/20 |
| 2004/0260180 | A1* | 12/2004 | Kanai et al. ................... 600/449 |
| 2005/0004467 | A1* | 1/2005 | Shiina et al. .................. 600/449 |
| 2005/0119642 | A1* | 6/2005 | Grecu et al. ....................... 606/5 |
| 2006/0058592 | A1* | 3/2006 | Bouma et al. ................. 600/301 |
| 2007/0123777 | A1* | 5/2007 | Watanabe et al. ............. 600/437 |
| 2007/0282202 | A1* | 12/2007 | Maurice et al. ............... 600/438 |
| 2008/0075375 | A1* | 3/2008 | Unal et al. ..................... 382/243 |
| 2008/0285819 | A1* | 11/2008 | Konofagou et al. .......... 382/128 |
| 2009/0024032 | A1* | 1/2009 | Kato et al. ..................... 600/443 |
| 2010/0081931 | A1* | 4/2010 | Destrempes et al. ......... 600/437 |

OTHER PUBLICATIONS

Zhang et al., LDA Calculations of the Young's Moduli of Polyethylene and Six Polyfluoroethylenes, Solid State Communications, Sep. 21, 2000, vol. 116, No. 6, pp. 339-343.

* cited by examiner

IMAGE PROCESSING METHOD FOR ESTIMATING A RISK OF ATHEROMA PLAQUE BREAKAGE

This is a non-provisional application claiming the benefit of International application No. PCT/EP2009/065617 filed Nov. 23,2009.

DESCRIPTION

The present invention concerns the technical field of medical image processing. More particularly, the present invention concerns an image processing method for estimating the risk of rupture of an atheromatous plaque.

PRESENTATION OF THE PRIOR ART

Every year, cardiovascular disease claims more victims than cancer. Angina pectoris, myocardial infarction, sudden death and strokes are the consequences of atherosclerosis.

Histological studies have shown that a vulnerable atheromatous plaque can be defined as a large necrotic extracellular body 10 associated with a thin fibrous cap 20 (i.e. smaller than 100 μm) with macrophage infiltration.

When a coronary artery 30 irrigating the heart muscle (or myocardium) is obstructed by a thrombus triggered by spontaneous rupture of an atheromatous plaque, the region non-irrigated with oxygen is damaged. This mechanism is the cause of sudden death, unstable angina or myocardial infarction.

Several reports have revealed that these vulnerable plaques can be clinically detected by various techniques including Intravascular Ultrasound (IVUS), Optical Coherence Tomography (OCT), CT scanning and Magnetic Resonance Imaging (MRI).

However, predictions of rupture based on the morphology and composition of the plaque are still fairly imprecise and suffer from an insufficient number of risk indicators.

The current challenge is that the prediction of rupture of coronary plaque not only requires:

precise quantification of the thickness of the fibrous layer, and of the morphology of the necrotic body, but also and more especially precise knowledge of the mechanical properties thereof, and more specifically of the elasticity of the arterial wall and of the plaque components.

These data items can effectively allow accurate evaluation of peak stress at the fibrous layer, a criterion which appears to be a good biomechanical indicator for risk of plaque rupture.

Unfortunately, the in vivo identification of the mechanical properties of the plaque is difficult on account of its heterogeneity and the changing nature of these mechanical properties as and when the plaque develops.

More precisely, the creation of an image of elasticity (or stiffness) showing the elasticity of the analyzed blood vessel tissue amounts to a pre-requisite for a reliable calculation of stress distribution.

The computing of these elasticity images is a challenge which has been treated using a wide diversity of approaches.

By using plaque strain over a cardiac cycle as input data, several studies have been conducted to estimate images of vascular elasticity. Direct approaches or iterative, procedures have been proposed.

The iterative approaches use an optimization algorithm to minimize the error between measured strain and computed strain by means of a numerical model. Within this context, an improvement in the reconstruction of plaque elasticity depends upon the performance of the optimization algorithm.

For example, several groups have developed optimization and segmentation algorithms to extract elastic moduli from the plaque components. However, these methods do not have sufficient efficacy or performance levels to allow an elasticity image to be obtained when the atheromatous plaque comprises several neighbouring necrotic bodies which is often the case.

In addition, these methods do not perform well: 1) either for identification of the components and more particularly the stiff constituents of the plaque since they are unable to extract calcium inclusions, and 2) or for accurate quantification of the thickness of the fibrous cap, which therefore prevents any reliable diagnosis of plaque vulnerability.

Therefore, for precise diagnosis of the extent of vulnerability of an atheromatous plaque, the practitioner needs to have precise knowledge of:

the thickness of the fibrous cap,
the dimensions of the different constituents of the plaque,
the mechanical properties of all these constituents.

It is the objective of the present invention to allow a practitioner to estimate precisely the extent of vulnerability of an atheromatous plaque by providing not only a complete morphological description of the atheromatous plaque, but also a precise image of elasticity, in particular an elasticity image showing the elasticity of the different components of the atheromatous plaque when the plaque comprises several neighbouring necrotic bodies and in which calcium inclusions are taken into consideration.

With the present method, the practitioner is also able to obtain the other criteria with precision (i.e. the thickness of the fibrous cap and the dimensions of the necrotic bodies such as the thickness thereof) enabling the practitioner to estimate the risk of rupture of an atheromatous plaque.

DISCLOSURE OF THE INVENTION

For this purpose, a method is proposed for processing images to estimate the risk of rupture of an atheromatous plaque, comprising:

a step to receive an image called an <<elastogram>>, showing internal deformations resulting from the compression of blood vessel tissue, analyzed as a function of blood pressure, a step for pre-segmentation of the elastogram, to obtain a pre-segmented image comprising a plurality of zones, and a step to compute an elasticity image representing the elasticity of at least one region of the elastogram, the region corresponding to a selected zone from among the plurality of zones of the pre-segmented image, and the elasticity image enabling the user to estimate the risk of atheromatous plaque rupture, a method in which:

first, the pre-segmentation is performed considering the tissue to be an incompressible elastic solid, so as to determine the gradient of Young's modulus as being equal to the sum of the gradient of the Lagrange multiplier and a space-dependent vector, second, the pre-segmentation comprises the determining of the contours of each zone of the plurality of zones by means of said space-dependent vector.

Preferred, but non-limiting aspects of the method of the invention are the following:

the contours of each zone of the plurality of zones correspond to the maximum values of the space-dependent vector;

the space-dependent vector H is of the form:

$$H = -[\epsilon]^{-1} \operatorname{div}[\epsilon]$$

Where:
[ε] is the deformation matrix,
$[\epsilon]^{-1}$ the inverse of the deformation matrix,
div [ε] is the divergence of the deformation matrix.
the computing step of an elasticity image comprises a sub-step for watershed segmentation, in which the zones are successively selected from among the plurality of zones of the pre-segmented image;
the zones are selected successively, from the zone of the pre-segmented image with highest H intensity to the zone of the pre-segmented image with lowest H intensity;
the computing step of the elasticity image also comprises an optimization sub-step performed after the selection of each new zone n+1 during the segmenting step;
at the optimization step, the elasticity of the new zone n+1 selected at the segmenting step is estimated by minimizing an error called a strain error between the measured strains of the elastogram and the computed strains of the n+1 selected zones;
the computing step of the elasticity image comprises a comparison step of the elasticity image with a criterion for stopping the computation step of the elasticity image;
the stop criterion is that the difference between two strain errors computed during two successive steps characterizing the elasticities of the n and n+1 zones is greater than $10^{-7}$;
the stop criterion is that the number of selected zones is greater than 10.

The invention also concerns an image processing system to estimate the risk of atheromatous plaque rupture, characterized in that it comprises means for implementing the above-described method.

The invention also concerns a computer programme product comprising programme code instructions recorded on a medium which can be used on a computer, characterized in that it comprises instructions for implementing the above-described method.

PRESENTATION OF THE FIGURES

Figure 1:
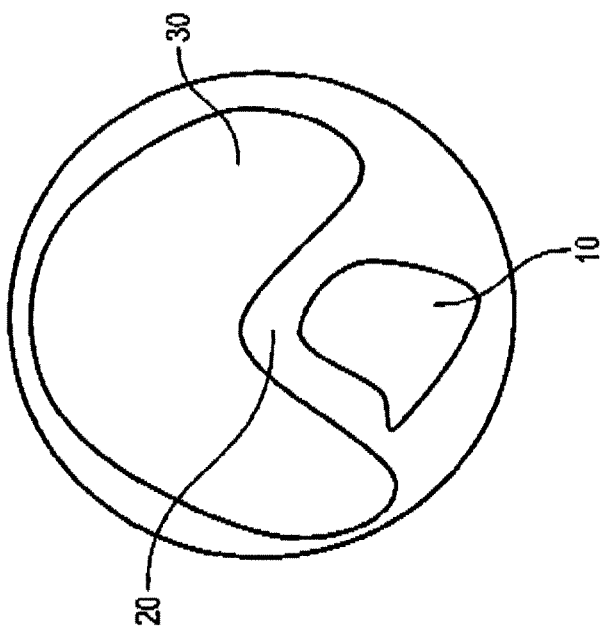
Figure 3:
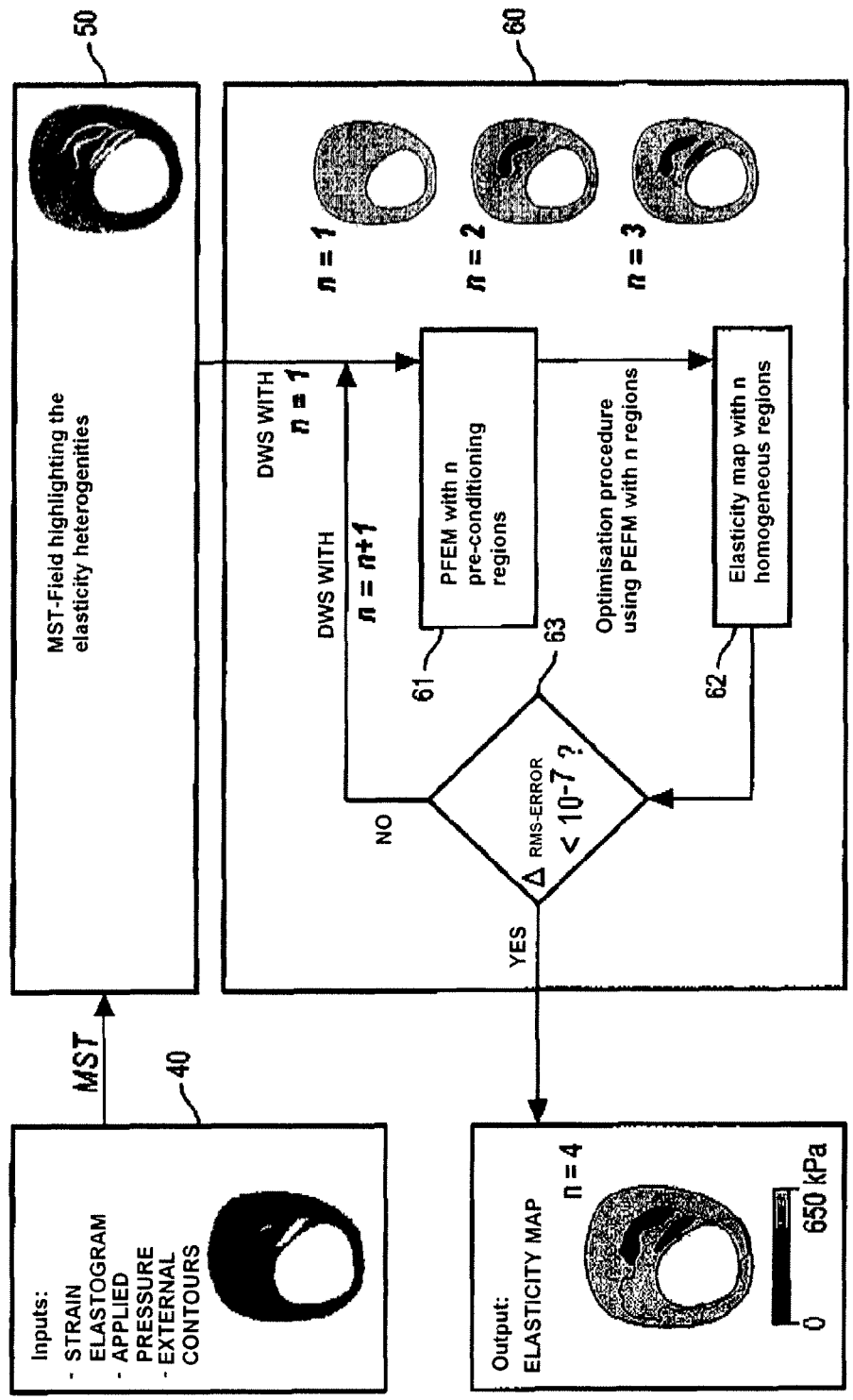

The invention will be better understood with reference to the following figures which are solely illustrative and non-limiting, and in which:

FIG. 1 schematically illustrates an atheromatous plague,

FIG. 2 illustrates one embodiment of an image processing system for estimating the risk of atheromatous plaque rupture, FIG. 3 illustrates one embodiment of the image processing method for estimating the risk of atheromatous plaque rupture.

DETAILED PRESENTATION OF THE INVENTION

The method of the invention will now be described in more detail.

As illustrated FIG. 3, the image processing method for estimating the risk of atheromatous plaque rupture comprises:

a step 40 to receive an image called "elastogram" showing internal deformations resulting from the compression of blood vessel tissue, analyzed as a function of blood pressure, a step 50 for pre-segmentation of the elastogram, to obtain a pre-segmented image comprising a plurality of zones, and a step 60 to compute an elasticity image representing the elasticity of at least one region of the elastogram, the region corresponding to a selected zone from among the plurality of zones of the pre-segmented image, and the elasticity image enabling the user to estimate the risk of atheromatous plaque rupture, As will be seen in detail below, this method is noteworthy in that:

first, the pre-segmentation is conducted considering the tissue to be an incompressible elastic solid, so as to determine the gradient of Young's modulus as being equal to the sum of the gradient of the Lagrange multiplier and of a space-dependent vector H, second, pre-segmentation comprises the determination of the contours of each zone of the plurality of zones by means of said space-dependent vector.

The reader will appreciate that the Lagrange multiplier gradient—mentioned above—derives from the condition of incompressibility of the medium.

The elastogram is obtained using any method known to persons skilled in the art. For example, the elastogram can be obtained in the following mariner. An ultrasound probe is inserted in the patient's artery at the portion of artery it is desired to analyze. A series of ultrasound images of the artery is acquired while the arterial tissue is compressed/dilated under the effect of heart beat. The elastogram or image of the distribution of deformations is estimated by examining the kinetics of the time sequence of ultrasound images.

The pre-segmentation step 50 allows an image to be obtained comprising a plurality of zones delimited by their contour. The contours of each zone of the plurality of zones correspond to the maximum values of the vector depending on space H.

The calculation step of the elasticity image 60 is then performed on the image obtained after the pre-segmentation step. This calculation step of the elasticity image comprises several sub-steps.

First a segmenting sub-step per line of dividing waters 61 is implemented. At this step, the zones are successively selected from among the plurality of zones of the pre-segmented image. The zones are selected one by one, from the zone of the pre-segmented image having highest intensity for H to the zone of the pre-segmented image of lowest intensity for H. More precisely, initially the zone of the image is selected whose contour value is the highest among the set of contour values of the image. The sub-steps described below are applied to this zone. Then another zone of the pre-segmented image is selected. This other zone corresponding to the zone whose contour value is the highest among the remaining non-processed zones of the image, and so on. If two ones have the same contour value, the zone to be treated first will be selected in relation to another criterion such as the size of the zone for example or any other criterion known, those skilled in the art;

Next, an optimization sub-step 62 is implemented. For each new selected zone, its elasticity is estimated. The elasticity of the new selected zone is estimated by minimizing an error called error on deformations, between the measured deformations of the elastogram and the calculated deformations of the set of selected zones.

More precisely, let us assume that n zones have already been selected and that the elasticities of these n zones have already been estimated.

A new zone n+1 is selected at the preceding sub-step 61. The elasticities of the n first zones have already been calculated and it is sought out determine the elasticity of the new selected zone n+1.

An elasticity value is assigned to this new selected zone n+1 for example of one. The deformation field of the n+1 selected zones is calculated with this assigned elasticity value of one for zone n+1.

Next the deformation error is calculated between the measured deformation field derived from the elastogram and the calculated deformation field of the n+1 selected zones, with this assigned elasticity value of one for zone n+1.

Then an elasticity value of two is assigned to zone n+1 and the step for calculation of the deformation field and of the deformation error are repeated for this assigned elasticity value of two for zone n+1, and so on.

For the selected zone n+1 the elasticity value is chosen which allows minimization of the deformation error.

Evidently, the estimation of the elasticity of each new selected region n+1 is not conducted by assigning elasticity value empirically; this estimation can be conducted using an iterative or recursive search process, such as dichotomy.

After estimating the elasticity of the new zone n+1 a test 63 is performed to determine whether the selection of another zone n+2 is or is not necessary.

Two stop criteria can be chosen.

The first is a function of the number of selected zones. If the number of selected zones is greater than 10, the process is stopped and no other zone of the pre-segmented image is selected.

The second is a function of the variation in deformation error between two successive zone selections. After estimating the elasticity of each new zone n+1, the deformation error obtained for the n+1 zones is compared with the deformation error obtained for the n first zones. If the difference between these two deformation errors calculated during two successive sub-steps (of zone selection estimation of the elasticity if he selected zone) is equal to or less than 10-7 then the process is stopped and no other zone of the pre-segmented image is selected.

An elasticity image of a plurality of selected zones is thus obtained as described above.

Some of these zones can then be merged in relation to different criteria such as overlapping of the zones for example, their shape or their elasticity value.

This gives an elasticity image of at least one region of interest chosen in the elastogram, each region corresponding to a zone selected from among the plurality of zones of the pre-segmented image. This elasticity image enables the user to estimate the risk of atheromaous plaque disruption, since this image indicates to the user:

- the thickness of the fibrous cap (which can be measured easily using a system of cursors positioned by the user for example),
- the dimensions of the different chosen regions of the plaque (which can be calculated for each region using methods known to persons skilled in the art),
- the mechanical properties of all these regions since the elasticity of each of these regions was estimated by means of the method of the invention.

The above-described method can be implemented on an image processing system for estimating a risk of atheromatous plaque disruption such as illustrated in FIG. 3. This system comprises data entry means 1, processing means 2, and display means 3. The data entry means 1 allow the user to enter data. These data entry means 1 comprise a computer keyboard and/or mouse for example. The processing means 2 are used for processing of radiological images. The display means 3 particularly allow the display of the images processed by the processing means.

A more detailed description will now be given of the theoretical aspects relating to the method and to the system of the invention.

General Principle

This theoretical study was designed to determine the complex modulogram of atheromatous plaque by means of a pre-segmentation step of the input data and using a novel approach combining segmenting by line of water dividing with optimization procedure allowing extraction of the morphology and Young's modulus of the components of the atheromatous plaque.

A combined approach based on the theory of continuous mechanics has been successfully applied to a coronary lesion of patient imaged in vivo using intravascular ultrasound (IVUS).

The robustness and performance of the method according to the invention were examined with respect to various factors which may affect the estimation of the vulnerability of the atheromatous plaque.

FIG. 3 illustrates the different steps of the method according to the invention based on a parametric finite element model (PFEM).

At a first step, using an elasticity gradient approach obtained extending the theoretical model proposed by Sumi et al, a criterion allowing the evidencing of the heterogeneities of the atheromatous plaque is obtained.

More particularly this criterion allows the evidencing of the heterogeneities of the atheromatous plaque from the radial deformation field. This mathematical for pre-conditioning data will be called a Modified Sumi's Transform (MST).

This mathematical pre-conditioning allows determination of an image of the spatial derivative of Young's modulus.

Next, a segmenting step of data by Dynamic Water Shed Segmentation (DWS) is applied to the data obtained at the preceding pre-conditioning step to obtain an elasticity image.

Contour Detection Step Based on the Theory of Continuous Mechanics

Skorovoda Transform

Skovoroda et al proposed a mathematical criterion to extract the contours of inclusions from the intraplaque deformation field and with knowledge of the local constraint continuity equation at the interface between the inclusions and the surrounding medium with the Young's moduli $E_{int}$ and $E_{ext}$ respectively.

The detection of each contour point was obtained by estimating the ratio:

- of the components of internal radial deformation $\epsilon_{ij}^{int}$ to
- the components of external radial deformation $\epsilon_{ij}^{ext}$
- along an arbitrary direction and within an infinitesimal region.

Therefore the position of the maximum ratios allowed evidencing of the inclusion contours. The simplified mathematical expression their criterion obtained considering that the material is incompressible and only taking into account the radial component of the stress tensor $\epsilon_{rr}$– is given by:

$$\frac{E^{ext}}{E^{int}} = \frac{\varepsilon_{rr}^{int}}{\varepsilon_{rr}^{ext}}$$

This criterion was used to evaluate the improvements provided by the method of the invention.

Sumi's Modified Transform

Assuming that the mechanical properties vary continuously in space, and writing the local equilibrium equation for an isotropic incompressible medium under planar stress loading, Sumi found a relationship between the vector gradient of Young's modulus and the stress tensor components. This criterion was successively used to reconstitute an image of rigidity for circular heterogeneity immersed in a continuum medium.

However it will, be noted that planar stress condition is not relevant for modelling deformation of the blood vessels.

It is therefore necessary to extend this approach to incompressible elastic media stressed under conditions of planar deformation. Considering that the atheromatous plaque is incompressible the expression of the gradient of Young's modulus was inferred as follows.

Assuming Linear Elasticity the Heterogeneous Medium is Described by Hooke's Law:

$$[\sigma] = -p[I] + \frac{2}{3}E(\vec{x})[\varepsilon]_\sigma$$

Where:
[σ] and [ε] are the stress and strain tensors
[I] is the identity matrix,
E is Young's modulus which is an arbitrary production of the position vector x, and
p is the Lagrange multiplier resulting from the incompressibility of the material given in the following kinematic stress:

Trace·[ε]=0

By neglecting gravity and inertial forces, the stress tensor [σ] meets the local equilibrium equation:

$$\nabla \cdot [\sigma] = \vec{0}$$

Substituting equations 2 and 3 in equation 4, the following equation is obtained of Young's modulus gradient:

$$\frac{\nabla E}{E} = \frac{3}{2}[\varepsilon]^{-1}\frac{\nabla p}{E} - [\varepsilon]^{-1}\nabla \cdot [\varepsilon]$$

Since the Lagrangian gradient cannot be measured experimentally, interest is more particularly focused on the second term of the above equation by considering that for the pre-segmentation step this second term can be used as criterion allowing determination of the position of the inclusion contours.

Therefore, a vector dependent on space H is introduced corresponding to the second term of the above equation, being defined such that:

$$\overline{H} = -[\varepsilon]^{-1}\nabla \cdot [\varepsilon]$$

In which is a space-dependent vector. The success of the reconstruction of an image of inclusions contours gives a posteriori validation of the relevance of the approach according to the invention.

In a two-dimensional (2D) system of polar coordinates, the components of the vector dependent on space H can be written in the form:

$$H_r = -\frac{1}{\varepsilon_{rr}^2 + \varepsilon_{r\theta}^2}\left\{\varepsilon_{rr}\left(\frac{\partial \varepsilon_{rr}}{\partial r} + \frac{1}{r}\frac{\partial \varepsilon_{r\theta}}{\partial \theta} + \frac{2\varepsilon_{rr}}{r}\right) + \varepsilon_{r\theta}\left(\frac{\partial \varepsilon_{r\theta}}{\partial r} - \frac{1}{r}\frac{\partial \varepsilon_{rr}}{\partial \theta} + \frac{2\varepsilon_{r\theta}}{r}\right)\right\}$$

$$H_\theta = -\frac{1}{\varepsilon_{rr}^2 + \varepsilon_{r\theta}^2}\left\{\varepsilon_{r\theta}\left(\frac{\partial \varepsilon_{rr}}{\partial r} + \frac{1}{r}\frac{\partial \varepsilon_{r\theta}}{\partial \theta} + \frac{2\varepsilon_{rr}}{r}\right) - \varepsilon_{rr}\left(\frac{\partial \varepsilon_{r\theta}}{\partial r} - \frac{1}{r}\frac{\partial \varepsilon_{rr}}{\partial \theta} + \frac{2\varepsilon_{r\theta}}{r}\right)\right\}$$

Wherein $\varepsilon_r\theta$ and $\varepsilon_r\theta$ are the tangential and shear components of the stress tensor.

To define a criterion dependent on the relative variation of the local Young's modulus, the projection dW of vector H is inserted on the elementary position vector dx such that:

$$dW = \vec{H} \cdot d\vec{x}$$

Indeed, using the equations 5, 6 and 8, dW can advantageously be expressed as follows:

$$dW = \left(\frac{\nabla E}{E} - \frac{3}{2}[\varepsilon]^{-1}\frac{\nabla p}{E}\right) \cdot d\vec{x} = \frac{dE}{E} - \frac{3}{2}[\varepsilon]^{-1}\frac{\nabla p}{E} \cdot d\vec{x}$$

This shows that dW is dependent upon the relative variation of the local Young's modulus. The approximation of dW by dE/F will be all the more accurate the smaller the components of the Lagrangian multiplier gradient.

In practice, radial stresses are the simplest estimator of the stress tensor using current ultrasound techniques.

This is why the above-described criterion is simplified by neglecting compression stresses. Therefore the expression of the criterion dW is now given by the following expression:

$$dW = -\frac{1}{\varepsilon_{rr}}\left(\frac{\partial \varepsilon_{rr}}{\partial r} + \frac{2\varepsilon_{rr}}{r}\right)dr - r\frac{1}{\varepsilon_{rr}}\frac{\partial \varepsilon_{rr}}{\partial \theta}d\theta$$

The partial derivatives of the radial stress components were calculated by convoluting the stress field with a Sobel mask. Therefore the amplitude of dW was calculated as a function of the defined regular polar mesh described above o allow an MST image to be obtained. The contours of each zone correspond to the lines where the amplitude of dW is greatest. This mathematical pre-conditioning step was called modified SUMI transform and was used to evidence the heterogeneities of atheromatous plaques.

Reconstruction of Young's Modulus

FIG. 3 schematizes the successive steps of the method according to the invention to identify the elasticity image of the radial stress field using the parametric finite element model.

From the MST field obtained at the pre-conditioning step, dynamic watershed segmentation combined with an optimization procedure was applied to obtain an elasticity map (modulogram) of the examined plaques.

On each iteration of the watershed segmentation step (i.e. for a given number of plaque inclusions), it is assumed that each inclusion has uniform stiffness.

The same Young's modulus was then identified using a gradient optimization procedure which minimizes the root mean square (RMS) error between the computed $\epsilon_{rr}^{meas}$ and $\epsilon_{rr}^{comp}$ of radial stresses in the plaque:

$$RMS_{plaque} - \text{error} = \sqrt{\frac{1}{N} \sum_{node,i} [\varepsilon_{rr}^{meas}(n_i) - \varepsilon_{rr}^{comp}(n_i)]^2}$$

where N is the total number of nodes in the plaque mesh and Ni is the $-^{th}$ node of the polar mesh plaque.

A stress was imposed during optimization: The unknown Young's moduli were classified between 0.1 kPa and 104 kPa, at this step a solution to the set of Young's moduli was found acceptable when the tolerance procedure allowed a threshold below 10-8 or when the number of regions was 30.

Finer segmentations were obtained by increasing the number of inclusions in an atheromatous plaque up to a maximum of 10.

It is known from studies on the morphology of atheromatous plaques that this is a realistic upper limit.

Additionally, from an algorithmic computing viewpoint, it was verified a posteriori that this upper limit was never reached by the optimization step.

The reader will appreciate that numerous modifications can be made to the above-described method and system without materially departing from the teachings of the present document. Such modifications are therefore included in the scope of the following claims.

The invention claimed is:

1. An image processing method for estimating risk of rupture of an atheromatous plaque, comprising:
   a step of receiving an image called an "elastogram" depicting internal deformations resulting from compression of a blood vessel tissue analyzed as function of blood pressure,
   a pre-segmentation step of the elastogram to obtain a pre-segmented image comprising a plurality of zones, and
   a computing step of an elasticity image showing the elasticity of at least one region in the elastogram, the region corresponding to a zone selected from among the plurality of zones of the pre-segmented image, and the elasticity image enabling the user to estimate the risk of rupture of an atheromatous plaque,
   a method wherein:
   first, the pre-segmentation step is performed considering the tissue to be an incompressible elastic solid so as to determine the gradient of Young's modulus as being equal to the sum of the gradient of the Lagrange multiplier and a space-dependent vector of the form $H=-[\epsilon]^{-1}$ div $[\epsilon]$, where $[\epsilon]$ is the deformation matrix, $[\epsilon]^{-1}$ the inverse of the deformation matrix, and div $[\epsilon]$ is the divergence of the deformation matrix,
   second, the pre-segmentation step comprises the determination of the contours of each zone of the plurality of zones by means of said space-dependent vector.

2. The method according to claim 1, wherein the contours of each zone of the plurality of zones correspond to the maximum values of the space-dependent vector.

3. The method according to claim 1, wherein the computing step of an elasticity image comprises a sub-step of watershed segmentation wherein the zones are successively selected from among the plurality of zones of the pre-segmented image.

4. The method according to claim 3, wherein the zones are successively selected from the zone of the pre-segmented image with highest intensity for H to the zone of the pre-segmented image with lowest intensity for H.

5. The method according to claim 3, wherein the computing step of the elasticity image also comprises a an optimization sub-step performed after selection of each new zone n+1 at the segmentation step.

6. The method according to claim 5, wherein at the optimization step, the elasticity of the new zone n+1 selected at the segmentation step is estimated by minimizing an error, called a strain error, between the measured strains of the elastogram and the computed strains of the n+1 selected zones.

7. The method according to claim 3, wherein the computing step of the elasticity image comprises a comparison step of the elasticity image with a criterion for stopping the computing step of the elasticity image.

8. The method according to claim 7 wherein the stop criterion is that the difference between two strain errors computed during two successive steps characterizing the elasticities of the n and n+1 zones is lower than $10^{-7}$.

9. The method according to claim 7, wherein the stop criterion is that the number of selected zones is greater than 10.

10. An image processing system for estimating risk of atheromatous plaque rupture, the system implementing the method according to claim 1,2,3,4,5,6,7,8 or 9.

11. A non-transitory computer readable medium comprising program code instructions for implementing the method according to claim 1,2,3,4,5,6,7,8 or 9.

* * * * *